INVENTORS.
FRANKLIN B. BOSSLER
JOHANNES G. GOERNER
FREDERICK D. POWELL
BY
ATTORNEYS

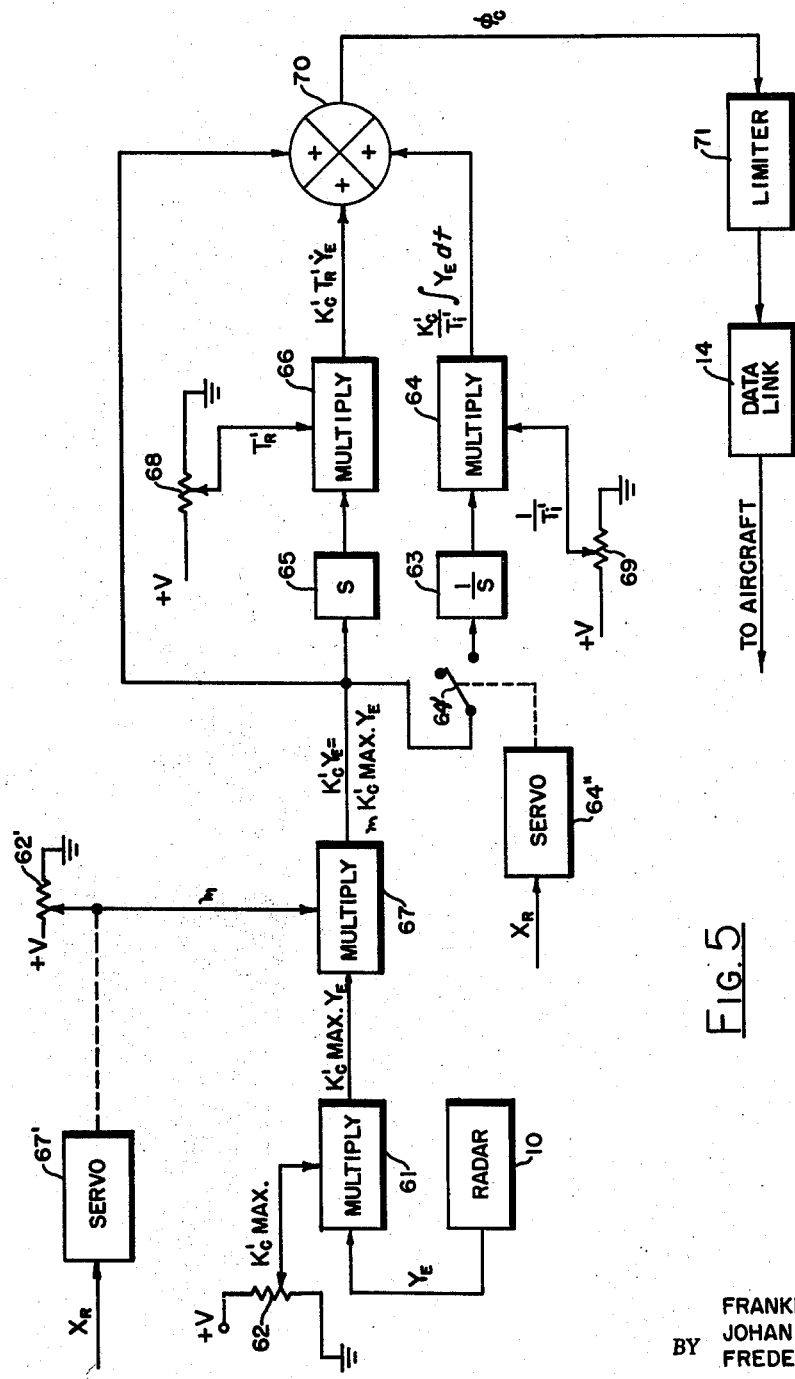

Fig. 8

| AIRCRAFT TYPE | PITCH CHANNEL | | | ROLL CHANNEL | | |
|---|---|---|---|---|---|---|
| | $K_c$ (%/FT.) MAX. | $T_R$ (SEC.) | $T_i$ (SEC.) | $K_c'$ (%/FT.) MAX. | $T_R'$ (SEC.) | $T_i'$ (SEC.) |
| Kc-135A | 0.167 | 2.8 | 11.5 | .052 | 12.2 | 17.0 |
| C-54G | 0.205 | 1.0 | 11.5 | .052 | 12.2 | 17.0 |
| F-105D | 0.106 | 3.0 | 11.5 | .052 | 12.2 | 17.0 |
| B-47E | 0.1175 | 2.83 | 11.5 | .052 | 12.2 | 17.0 |
| B-52G | 0.118 | 3.0 | 11.5 | .052 | 12.2 | 17.0 |
| F-101A | 0.093 | 2.2 | 11.5 | .052 | 12.2 | 17.0 |
| B-58A | 0.091 | 2.2 | 11.5 | .052 | 12.2 | 17.0 |
| C-118A | 0.127 | 2.2 | 11.5 | .052 | 12.2 | 17.0 |
| F-102A | 0.139 | 1.7 | 11.5 | .052 | 12.2 | 17.0 |
| C-131A | 0.126 | 1.5 | 11.5 | .052 | 12.2 | 17.0 |
| C-124A | 0.1215 | 2.5 | 11.5 | .052 | 12.2 | 17.0 |
| F-106B | 0.0867 | 2.0 | 11.5 | .052 | 12.2 | 17.0 |
| C-130A | 0.219 | 2.0 | 11.5 | .052 | 12.2 | 17.0 |
| U-3A | 0.307 | 1.2 | 11.5 | .052 | 12.2 | 17.0 |
| F-105B | 0.078 | 2.7 | 11.5 | .052 | 12.2 | 17.0 |
| C-47D | 0.194 | 1.2 | 11.5 | .052 | 12.2 | 17.0 |
| B-66B | 0.110 | 2.2 | 11.5 | .052 | 12.2 | 17.0 |
| C-133A | 0.110 | 2.2 | 11.5 | .052 | 12.2 | 17.0 |
| C-121C | 0.137 | 2.2 | 11.5 | .052 | 12.2 | 17.0 |

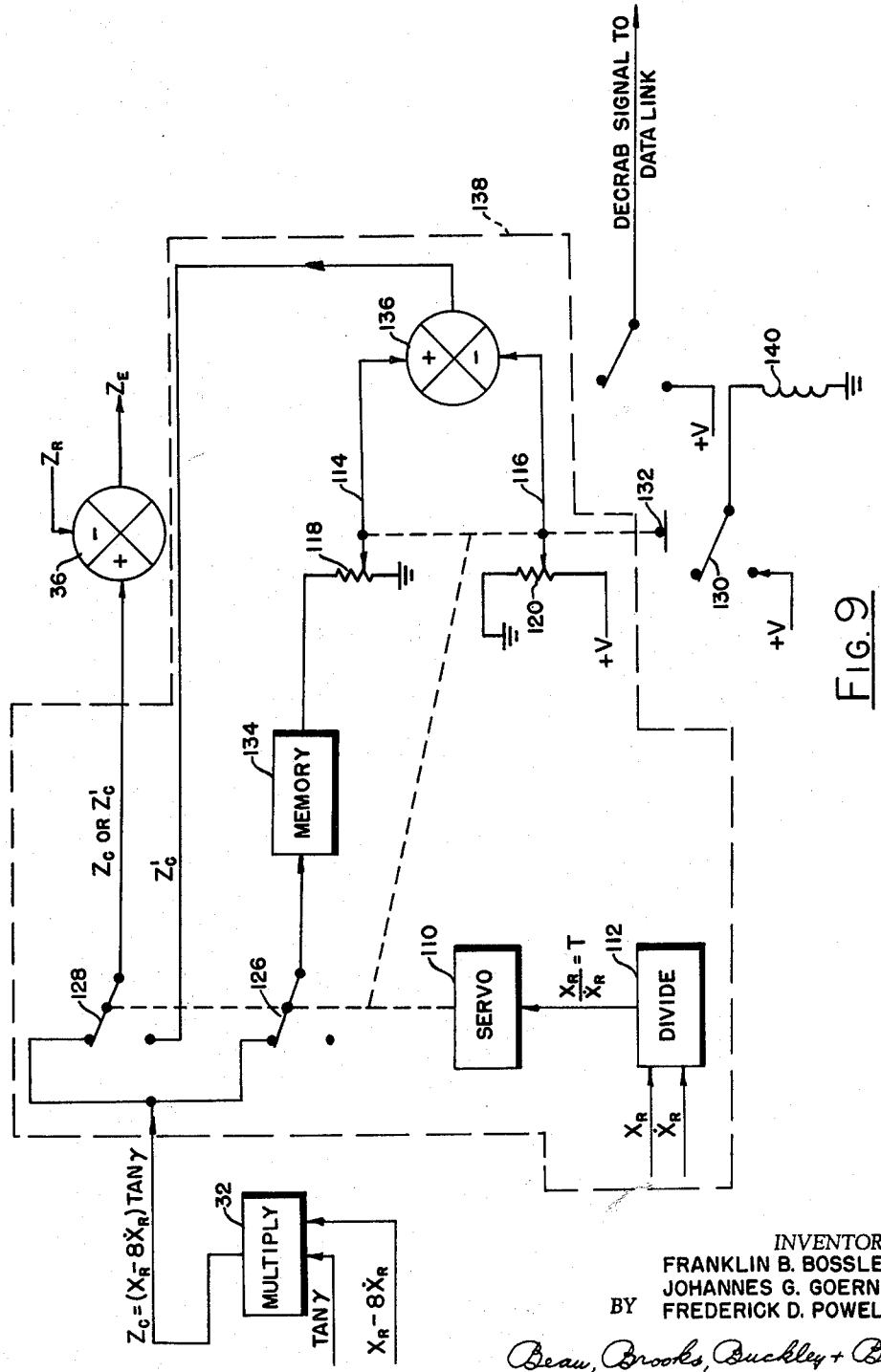

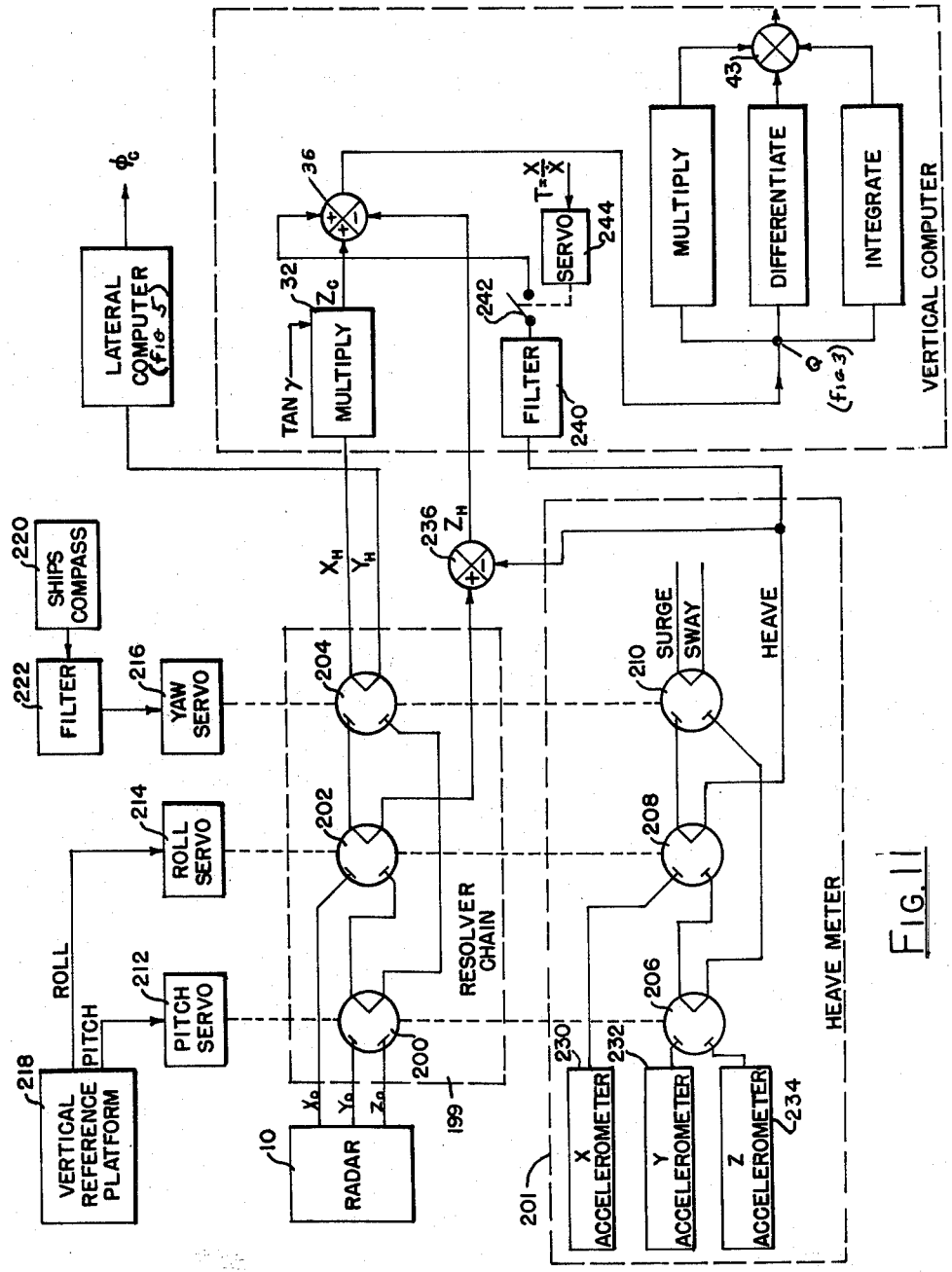

Fig. 12

| AIRCRAFT TYPE | PITCH CHANNEL | | | ROLL CHANNEL | | |
|---|---|---|---|---|---|---|
| | $K_c$ (%/FT) MAX. | $T_R$ (sec) | $T_i$ (sec) | $K_c'$ (%/FT) MAX. | $T_R'$ (sec) | $T_i'$ (sec) |
| F4H | 0.17 | 1.5 | 15 | 0.1 | 10 | 15 |
| W2F | 0.20 | 1.0 | 20 | 0.045 | 10 | 25 |
| A2F | 0.25 | 2.0 | 15 | 0.08 | 10 | 20 |
| F3D | 0.20 | 3.0 | 20 | 0.1 | 10 | 15 |

United States Patent Office 3,174,146
Patented Mar. 16, 1965

3,174,146
AUTOMATIC LANDING SYSTEMS
Franklin B. Bossler, Tonawanda, Johannes G. Goerner, Buffalo, and Frederick D. Powell, Niagara Falls, N.Y., assignors to Bell Aerospace Corporation
Filed Oct. 12, 1962, Ser. No. 230,239
23 Claims. (Cl. 343—5)

This invention relates to externally and automatically controlled precision landing systems for aircraft, and more particularly to improvements in equipment for automatically landing, at sea or ashore, piloted or pilotless aircraft under all conditions of weather, visibility, ship motion, or other such factors. The invention provides an improved all-weather control system for any controllable air vehicle in connection with its navigation and landing approach and landing operations; and thus relates to improvements in the specific art of guiding aircraft to landings from ground stations, such as in systems disclosed for example in U.S. Patent 2,459,482. This application is based upon our copending application Serial No. 797,899, filed March 9, 1959, and now abandoned.

The problem to which the present invention is addressed to that of guiding and controlling aircraft with such accuracy and perfection as to enable the aircraft to be automatically guided and controlled to or substantially to an intended touchdown point even though visibility or other factors would preclude safe manual control of the aircraft to such point. Generally speaking, this objective of the present invention is accomplished by improvements in the type and manner of automatic control commands for the aircraft. More specifically, such improvements concern the formulation of control commands at the ground-based station for relay to the aircraft and, moreover, the improvements concern the utilization of specific types of control commands which are effective to establish a high degree of accuracy and stabilization of the system and which, with specifically controlled variations thereof, accommodate for many and diverse kinds of aircraft.

Another object of the invention is to provide an improved automatic landing control system as aforesaid which employs ground-based radar and improved command computer mechanisms for accomplishing its purposes, while requiring no airborne electronics equipment other than devices conventionally carried.

Another object is to provide an improved system as aforesaid which is compatible with and conjunctively operable with currently used military and commercial navigation and landing approach aids.

Another object is to provide an improved system as aforesaid which will afford precise and reliable aircraft control in glide slope and azimuth during the most critical approach and landing phases of flight.

Another object is to provide an improved system as aforesaid which is inherently so flexible as to be readily adapted to handle all types of low- and high-speed landing fixed-wing and rotary wing and vertical take off and landing type aircraft under all weather conditions, thus reducing approach "holding" time to a minimum and allowing multiple runway utilization.

A more specific object of the present invention is to provide in an improved system as aforesaid a ground-based comparison of actual glide path to desired flight path, a display of the difference between the actual path and the desired path, both in elevation and in lateral position, to permit visual monitoring of the same; and computation of corrective commands in response to such comparison; the corrective commands being transmitted to the aircraft and inserted into the autopilot without further computational modification.

Still another more specific object of the invention is to provide in a system as aforesaid an improved corrective command computation mechanism, whereby the system will be substantially invulnerable to radar noise or turbulence effects such as normally tend to render prior type systems impracticable.

More specifically, the above object is achieved by providing a pitch command signal which is dependent upon a voltage proportional to the vertical deviation of the aircraft from the intended or desired flight path, such voltage being amplified by a static gain coefficient of the closed loop system of which the computer for the pitch command signal forms a part; the voltage further being modified and amplified by a pitch command computer lead coefficient and a coefficient of integration, the several coefficients and the form of the pitch command signal being such as to permit the system to be stabilized and relatively insensitive to errors caused by turbulence, component drift and the like. Moreover, the present invention contemplates an improved form of pitch command signal which incorporates therein certain coefficients of amplification, themselves being singly or collectively variable for given aircraft types, which coefficients within very narrow limits of adjustment or variation accommodate the optimum coefficient values for a great many different aircraft types. Further, the pitch command signal is of such form as to render the system relatively insensitive to slight variations of the coefficients from optimum values. Thus, a relatively few fixed values of the coefficients permit accommodation to a great many aircraft types.

Other objects and advantages of the invention will appear from the description hereinbelow and the accompanying drawing wherein:

FIG. 5 is a block diagram of a computer for obtaining the roll control commands;

FIG. 8 illustrates charts relating the coefficients of the pitch command and roll command signals to various types of aircrafts;

FIG. 9 is a diagram illustrating the principles of the flare out compensation system;

FIG. 10 is a diagram illustrating the path achieved by the flareout computer;

FIG. 11 is a diagram illustrating the construction of a mechanism used cumulatively with those of FIGS. 3 and 5 to achieve landing aboard ship; and FIG. 12 illustrates charts relating the coefficients of the pitch command and roll command signals to various types of aircraft to be landed aboard ship.

Figure 1:
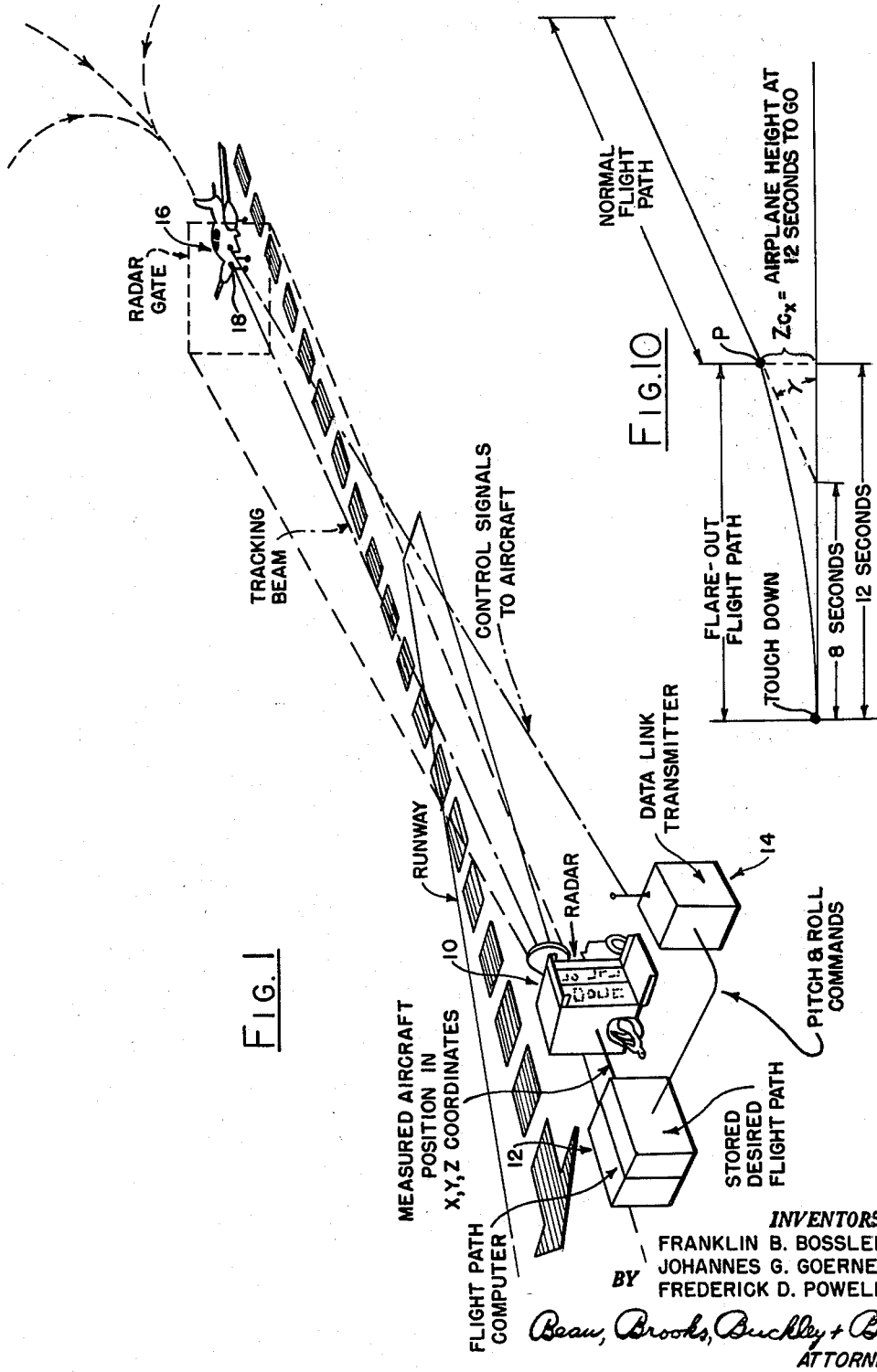
FIG. 1 is a diagrammatic illustration of a landing system according to the present invention.
Figure 2:
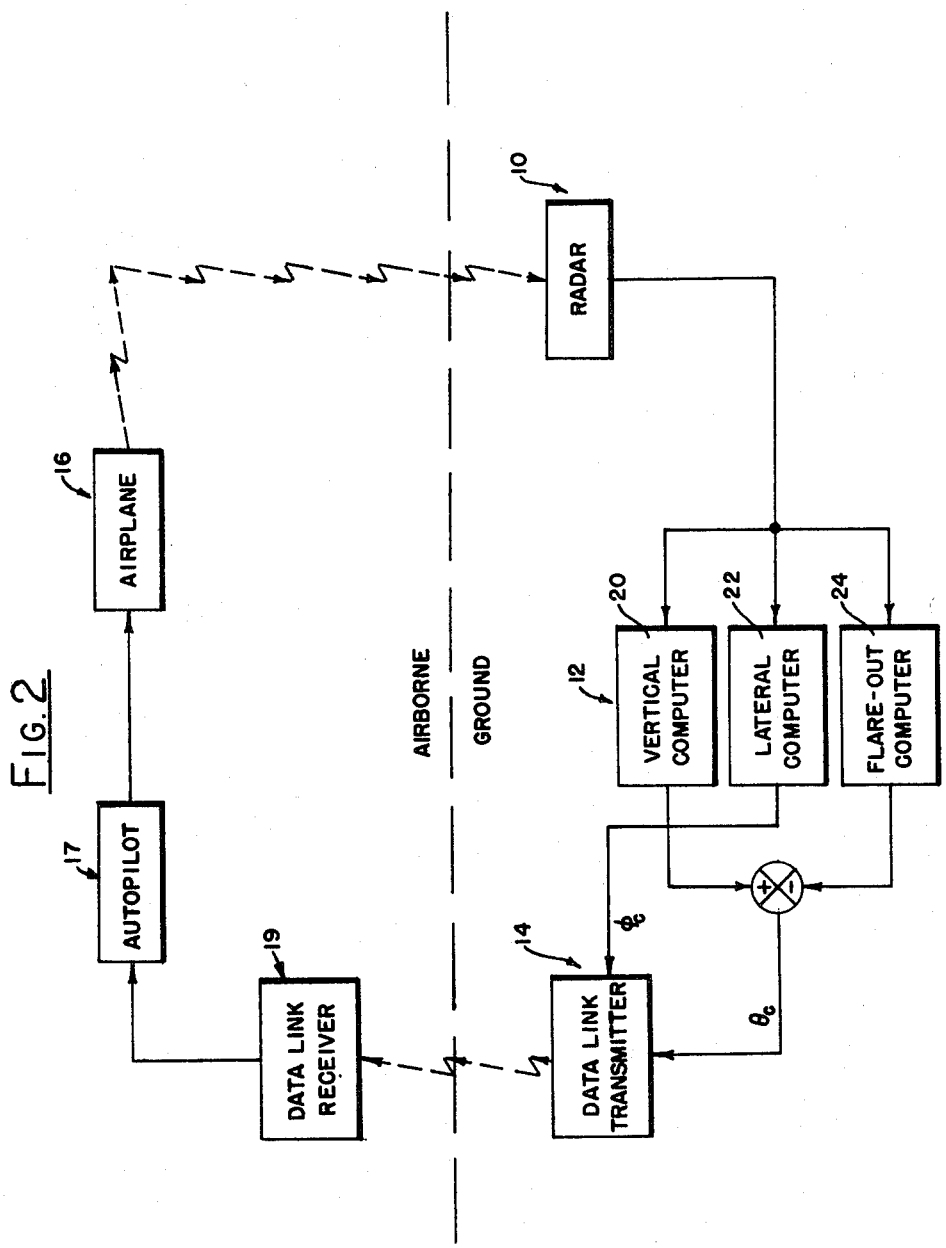
FIG. 2 is a diagram showing a closed-loop system according to the invention.

This invention contemplates generally, as shown in FIG. 1, provision of an automatic control landing system comprising a precise tracking radar 10; a comparative flight path computer 12; a data link transmitter 14; and an autopilot carried by the aircraft 16; all of which components are arranged in a closed-loop system as shown diagrammatically in FIG. 2. The radar antenna may be of the parabolic reflector type, mounted on gimbals to permit it to scan the horizontal and vertical planes.

The preferred antenna dish is dimensioned to permit a ½ degree beam-width which uses circularly polarized transmission to insure pinpoint tracking even in heavy rain. Also the narrow beam-width is preferably used to overcome Lloyd's "mirror effect" at low tracking angles.

A circularly polarized corner reflector 18 is preferably mounted on the aircraft to give optimum radar returns; the reflector measuring about eight inches to twelve inches across at its largest dimension depending on the size of the aircraft, and acts as a "point" target for accurate measurements of the aircraft position. The corner reflector may be fixed under the nose of the aircraft or on a landing gear strut, or at any other unobstructed position.

The approaching aircraft 16 enters a radar "gate" located in space from one to four miles away from the point of touchdown and when the aircraft enters such "gate," the radar component 10 thereupon locates and locks onto the approaching aircraft and supplies the computer 12 with the instantaneous position coordinates of the airplane. The desired flight path, preselected by the operator for the particular aircraft type, is compared in the computer 12 with the measured flight path and corrective commands $\theta_C$ and $\phi_C$ (for pitch and roll) are then transmitted via the data link transmitter 14 to the aircraft to maintain it on the desired flight path to the touchdown point on the runway. The pitch and roll commands and flare-out commands, when desired, are computed by subassemblies of the flight path computer 12. This is shown in FIG. 2 wherein the flight path computer 12 is illustrated as including the vertical (pitch command) computer 20, the lateral (roll command) computer 22 and the flare-out computer 24. FIG. 2 also shows the nature of the closed loop system; that is, the airplane 16 is illustrated after detection by the radar 10, as being controlled by the autopilot 17 which obtains its control from the data link receiver 19 responding to the command signals transmitted by the data link transmitter 14.

The present invention contemplates that the aircraft position errors are passed through an improved ground-based computing network which determines corrective pitch and bank commands in an improved manner. The aerodynamic characteristics of the aircraft are taken into consideration by the computer in order that optimum performance of the system may be achieved, obviating the necessity for introducing new components into the aircraft such as angle of attack indicators, accelerometers, integrating vertical-velocity-meters, etc.

Beginning with the moment the controlled aircraft enters the gate, the system calculates exactly in rectangular coordinates of range, lateral position and altitude (X, Y & Z) where the plane should be relative to the touchdown point. The radar acquires and locks onto the aircraft when it reaches the gate and tracks it all the way till it touches the landing surface. While locked onto the target, the radar gives the aircraft position in three-dimensional spherical coordinates (range, azimuth and elevation angle). These dimensions are converted to rectangular form as above and fed to the computer for comparison with the stored ideal flight path.

The computer measures the difference between where the aircraft is and where it should be. The difference appears as two D.C. voltages ($Y_E$ and $Z_E$) representing the lateral and vertical position errors, respectively. Pitch and roll correction signals derived from these position error voltages are then sent to the aircraft, as roll and pitch command signals $\phi_C$ and $\theta_C$ respectively, together with discrete signals for wave-off and de-crab, when necessary, via the data link.

We have found that if the pitch and roll command computers are chosen in the general form:

(A) $\qquad \theta_C = C_1 Z_E + C_2 \dot{Z}_E + C_3 \int Z_E dt$ (B) $\qquad \phi_C = K_1 Y_E + K_2 \dot{Y}_E + K_3 \int Y_E dt$ where $C_1$, $C_2$, $C_3$, $K_1$, $K_2$ and $K_3$ are constants; $Z_E$ is altitude error; $\dot{Z}_E$ is the first derivative, with respect to time, of altitude error; $Y_E$ is the lateral position error and $\dot{Y}_E$ is the first derivative, with respect to time, of $Y_E$, a system having an unexpected degree of accuracy is obtained. That is to say, using pitch and roll command computer as above, we have found that the accuracy achieved is sufficient to permit completely "hands off" landings. As a result, the present system may be used to automatically guide the aircraft to safe landing, at a designated touchdown area, under the most adverse conditions of visibility.

More specifically, the pitch command computer is chosen in the general $s$ operator form:

(1) $\qquad \theta_C(s) = K_C \left[ \{1 + T_R s\} \left\{1 + \frac{1}{T_i s}\right\} \right] Z_E(s)$ where $\theta_C$ = pitch command
$K_C$ = the static gain coefficient of the pitch command computer
$T_R$ = the main coefficient of the lead characteristic of the pitch command computer
$T_i$ = the integral time constant
$Z_E$ = altitude error It will be appreciated that filtering shall be used where appropriate with the understanding that at the natural frequency of the closed loop system, the filters must not affect the phase angle of the input or output signals. It will further be understood that the optimum values of $K_C$, $T_R$ and $T_i$ will vary in accord with the particular type of aircraft involved. However, we have found that the optimum values of $K_C$, $T_R$ and $T_i$ fall within unexpectedly narrow ranges and further that slight variations from the optimum values of the pitch command computer coefficients $K_C$, $T_R$ and $T_i$ do not sharply degrade performance so that it is possible to gather a large number of aircraft types into a very small number of groups. This leads to a striking degree of simplicity in the ground-based pitch command computer. A table showing values of pitch command computer coefficients $K_C$, $T_R$ and $T_i$ in connection with several different types of Air Force aircraft is illustrated in FIG. 8, while a table showing values of these coefficients in connection with several different types of Navy aircraft is illustrated in FIG. 12. As will be obvious, the Air Force aircraft will utilize a fixed airfield as opposed, for example, to Navy aircraft which would normally land aboard a carrier. Thus, while landing on a fixed airfield may not require the greatest degree of accuracy, the coefficient $T_i$ remains fixed for all types of Air Force aircraft and the value thereof as indicated in FIG. 8 represents an average optimum value for all the types of aircraft specified. The coefficient $K_C$, as will hereinafter appear, depends mainly upon the landing speed of the aircraft. Since the landing speeds of different types of aircraft are normally different, it is necessary to vary $K_C$ from type to type of aircraft, as shown. The coefficient $T_R$, as will hereinafter appear, is dependent upon several aircraft parameters and, as would be expected, varies from type to type also.

Referring back to Equation 1, it will be understood that the selected form of this equation results in a high degree of accuracy for the closed loop system due to the minimization of sensitivity to any type of error. The low level of sensitivity (high degree of stabilization) is a result of the correctly chosen lead characteristic of the pitch command computer (as expressed in the term $T_R$) which, in turn, permits the natural frequency and static gain of the closed loop system to be proportionally increased.

To better understand the requisite nature of the pitch command computer, Equation 1 may be rewritten as follows:

(1) $\qquad \theta_C(s) = K_C \left[ \{1 + T_R s\} \left\{1 + \frac{1}{T_i s}\right\} \right] Z_E(s)$ (2) $$\theta_C(s) = K_C\left[\left\{1+\frac{T_R}{T_i}\right\} + T_R s + \frac{1}{T_i s}\right] Z_E(s)$$

(3) $$\theta_C = K_C\left[\left\{1+\frac{T_R}{T_i}\right\} Z_E + T_R \dot{Z}_E + \frac{1}{T_i}\int Z_E dt\right]$$

it being noted that in Equation 3 the $s$ operator form has been replaced by the more conventional notation, $$\dot{Z}_E = \frac{d}{dt} Z_E = s Z_E$$

and $$\int Z_E dt = \left\{\frac{1}{s}\right\} Z_E$$

It will also be noted that Equation 3 is identical to the above general Equation A with $$C_1 = K_C\left\{1+\frac{T_R}{T_i}\right\}; \quad C_2 = K_C T_R;$$

and $$C_3 = \frac{K_C}{T_i}$$

Figure 3:
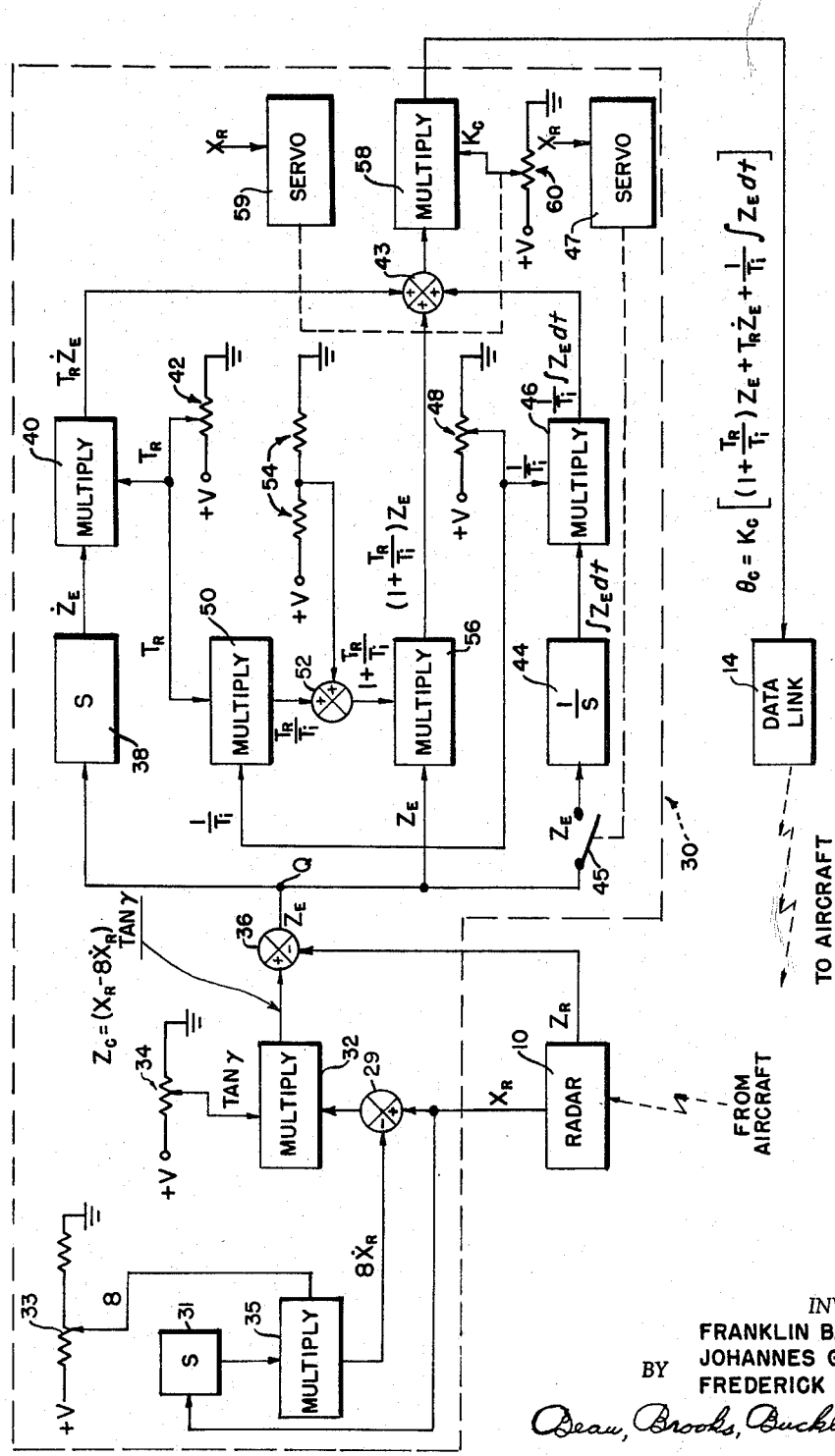
FIG. 3 is a block diagram of a computer for obtaining the pitch control commands.
Figure 6:
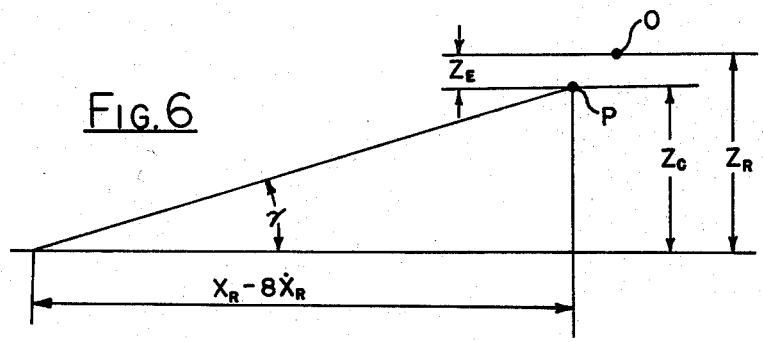
FIG. 6 is a diagram illustrating certain principles in connection with the computer of FIG. 4.

As has been pointed out above, the requirements for a land-based system as opposed to an aircraft carrier-based system are somewhat different due to the greater degree of accuracy necessary for carrier landings. Moreover, in the land-based system, flareout of the aircraft is used while no flareout is used in the carrier-based system. While the pitch command computer for both types of systems is essentially the same insofar as the accuracy aspect is concerned, there may be a slight difference therein due to the above-mentioned fact that the land-based system introduces a flareout command function while the carrier-based system does not. FIG. 3 illustrates the system as used for land-based landings and the modification used for compatability with flareout is shown therein. This modification concerns the term $Z_C$ which, as illustrated in FIG. 6, is the computed desired height of the aircraft in the glide slope, at point P. This computed desired height $Z_C$ is obtained, as shown in FIG. 3, by multiplying a scale factor proportional to the glide slope angle $\gamma$ by a voltage $X_R - 8\dot{X}_R$, where $X_R$=radar-measured range. Thus, the aircraft is always slightly "ahead of itself"; the purpose being hereinafter apparent since it has significance only in conjunction with flareout commands which are achieved by the means illustrated in FIG. 9.

Considering Equation 3 and referring to FIGS. 3 and 6, it will be seen that the altitude error $Z_E$ which represents the vertical difference between the actual position O of the aircraft (radar-measured height $Z_R$) and the intercept point P on the glide slope path at which it is desired the airplane should be determined by obtaining the difference between the height $Z_C$ at point P and the radar-measured height $Z_R$. The height $Z_C$ is obtained by multiplying the tangent of the glide slope angle $\gamma$ by the term $X_R - 8\dot{X}_R$.

As shown in FIG. 3, the pitch command computer includes those components within the broken line as indicated at 30, such components including the multiplying circuit 32 in which the product $(X_R - 8\dot{X}_R) \tan \gamma$ is obtained. The term $\tan \gamma$ is applied as the output of a potentiometer 34 so that adjustment can be made for different glide path angles, as desired and necessary. For the purpose of the land-based system, the multiplying network 32 also has an input obtained from the radar-measured range $X_R$. As shown, this input is obtained from the subtractor 29. The subtractor 29 has an input $X_R$ and an input $8\dot{X}_R$, the latter being obtained by differentiating the radar-measured range $X_R$ in the differentiating network 31 and multiplying this differential by the scale factor 8, obtained by voltage divider 33, in the multiplying network 35. The difference between the radar-measured range $X_R$ and the output of network 35 is applied to the multiplying network 32. The difference between the output of this multiplying circuit 32 and the radar-measured altitude $Z_R$ is obtained from the subtractor 36, such difference being the altitude error $Z_E$.

Bearing Equation 3 in mind, in one branch of the pitch command computer, the altitude error $Z_E$ is differentiated in the differentiating network 38 and multiplied by a scale constant $T_R$ in the multiplying network 40. The scale constant is obtained as the output of the potentiometer 42 so that the optimum value of this coefficient [Equations 1 and 3] may be selected as desired and necessary. The output $T_R \dot{Z}_E$ of the multiplying network 40 is applied to the adding network 43 as are the outputs of the other branches hereinafter described.

Another branch of the pitch command computer includes the integrating network 44 to which the term $Z_E$ is applied and the expression $$\frac{1}{T_i}\int Z_E dt$$

is completed by the multiplying network 46. The scale constant $$\frac{1}{T_i}$$

is applied to the multiplying network 46 as the output of the potentiometer 48 whereby this coefficient $$\frac{1}{T_i}$$

is also variable when desired.

The third branch obtains the term $$\left\{1+\frac{T_R}{T_i}\right\} Z_E$$

of Equation 3. The coefficient term $$\left\{1+\frac{T_R}{T_i}\right\}$$

is obtained by multiplying, in the network 50, the outputs of the potentiometers 42 and 48 and adding to this product the constant scale factor 1 in the adding network 52. The constant scale factor may be obtained, for example, by means of a suitable voltage divider chain 54. This coefficient term is then multiplied by the altitude error $Z_E$ in the multiplying network 56, obtaining the output $$\left\{1+\frac{T_R}{T_i}\right\} Z_E$$

as shown.

As previously stated, the outputs of the three branches are summed in the network 43 and this summed output is multiplied by the scale factor $K_C$ in the multiplying network 58, the scale factor $K_C$ being obtained as the output of the potentiometer 60 so that this coefficient is also variable.

Figure 4:
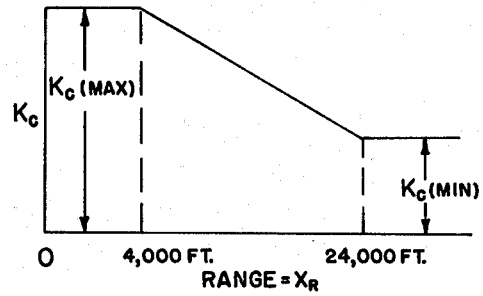
FIG. 4 is a chart showing the variation of the vertical computer gain coefficient $K_c$ with range.

It will be noted that the input to the integrating network 44 is through a normally open switch 45 controlled by a servomechanism 47 or suitable means for closing the switch 45 when the range of the aircraft has decreased to a predetermined value. For this reason, the means 45 is shown as having an input indicative of the range $X_R$, a preferred point at which the switch closes being when the range has decreased to 16,000 feet. Thus, until the range has decreased to 16,000 feet, the output of the pitch command computer contains only the terms $$\left\{1+\frac{T_R}{T_i}\right\} Z_E$$

and $T_R \dot{Z}_E$. Furthermore, the gain coefficient $K_C$ is attenuated until the range decreases to 4,000 feet, the specific relationship being shown in FIG. 4 wherein it will be seen that the gain coefficient remains at a minimum $K_C$ (min.) until the range decreases to 24,000 feet, whereafter the gain coefficient increases linearly until, at 4,000 feet range, it reaches its maximum value $K_C$ (max.). To accomplish this, the servomechanism 59 is provided having a range input $X_R$ and having connection to the potentiometer 60 to vary the coefficient $K_C$ according to FIG. 4.

Thus, at range greater than 24,000 feet, the output of the pitch computer is $$\theta_C = K_C(\min.)\left[\left\{1 + \frac{T_R}{T_i}\right\}Z_E + T_R\dot{Z}_E\right]$$

between 16,000 and 24,000 feet range, the output is $$\theta_C = mK_C(\max.)\left[\left\{1 + \frac{T_R}{T_i}\right\}Z_E + T_R\dot{Z}_E\right]$$

where $0.25 < m < 1.0$; between 16,000 feet and 4,000 feet range, the output is $$\theta_C = nK_C(\max.)\left[\left\{1 + \frac{T_R}{T_i}\right\}Z_E + T_R\dot{Z}_E + \frac{1}{T_R}\int Z_E dt\right]$$

where $m < n < 1.0$; and between 4,000 feet and touchdown, the output is $$\theta_C = K_C(\max.)\left[\left\{1 + \frac{T_R}{T_i}\right\}Z_E + T_R\dot{Z}_E + \frac{1}{T_i}\int Z_E dt\right]$$

The integral term is eliminated, as above, until it is assured that the aircraft, no matter how great its initial vertical deviation upon entering the radar "gate," will be close to the glide path. In this fashion, a large degree of overshoot or "hunting" is eliminated. The gain coefficient $K_C$ is varied as above in order to avoid excessive control commands which might occur at acquisition and at any time the vertical or altitude error $Z_E$ is likely to be large. By the time range has decreased to 4,000 feet, this error can be expected to be very small.

Although FIG. 8 shows exemplary values for $K_C$, $T_R$ and $T_i$ for various types of aircraft using a fixed airfield (as opposed to a movable airfield such as an aircraft carrier), it might be mentioned, without resorting to complex mathematics beyond the purview of this disclosure which is involved at arriving at the optimum values, that $$K_C(\max.) = \frac{39.6}{V_0}$$

degrees/foot where $V_0$ is aircraft speed in ft./sec. Likewise, $T_R$ $$(\text{optimum}) = \frac{1}{L_{\alpha*}}$$

where $L_{\alpha*}$ is the frequency break point $$\left(\frac{\text{rad.}}{\text{sec.}}\right)$$

of the first order lag in the transfer function $$\frac{\Delta T}{\theta_C}$$

which relates the change in inertial angle of climb or descent ($\Delta T$) to the pitch $\theta_C$ and which term $$\frac{1}{L_{\alpha*}} = \frac{1 - \frac{M_\alpha}{K_0 M_{\zeta\epsilon}}}{L_\alpha}$$

where $M_\alpha = \left(\frac{1}{\text{sec.}^2}\right)$ normalized moment coefficient $\left(\frac{\ddot{\theta}}{\alpha}\right)$ $K_0$ = autopilot pitch gain $\left(\frac{\zeta\epsilon}{\theta}\right)$ $M_{\zeta\epsilon} = \left(\frac{1}{\text{sec.}^2}\right)$ normalized control moment coefficient $\left(\frac{\ddot{\theta}}{\zeta\epsilon}\right)$ $L_\alpha = \left(\frac{1}{\text{sec.}}\right)$ normalized lift coefficient $\left(\frac{\dot{T}}{\alpha}\right)$ and the angles $\alpha$, $\zeta\epsilon$ and $T$ being the aerodynamic angle of attack, the elevator deflection and the inertial angle of descent (or climb) respectively and $\theta$ being the pitch angle. Finally, the coefficient $$T_i = \frac{4(K_i + 1)}{K_C V_0 T_R L_\alpha}$$

in which $K_i$ is the gain of integral of the vertical accelerometer output if any such exists into the autopilot $$\left(\frac{\theta_C}{T}\right)$$

and all other variables are as given hereinabove.

As has been previously stated, the three pitch command computer coefficients $K_C$, $T_R$ and $T_i$ may all be varied from aircraft type to aircraft type. However, we have found that of these three coefficients, it is possible to vary only the coefficient $T_R$, while leaving the coefficients $K_C$ and $T_i$ fixed at arbitrarily selected average optimum values, and still obtain an acceptable system. For example, with conventional land airfields the coefficient $T_R$ alone may be varied. If one wishes to obtain a still more accurate system, both the coefficients $T_R$ and $K_C$ could be varied. Needless to say, for greatest accuracy, as with Navy aircraft, all three coefficients $T_R$, $K_C$ and $T_i$ would be varied, since for land-based aircraft the landing requirements are less stringent than for Navy aircraft.

In the lateral computer, the following $s$ operator form is used:

(4) $\qquad \phi_C(s) = K_C'\left\{1 + T_R's + \frac{1}{T_i's}\right\}Y_E(s)$ where $\phi_C$ = roll command
$K_C'$ = lateral static gain coefficient of the closed loop system
$T_R'$ = the gain coefficient of the lead characteristic of the lateral computer
$T_i'$ = the integral time constant
$Y_E$ = the lateral displacement.

As in the case for the vertical computer, as explained above, the values of $K_C'$, $T_R'$ and $T_i'$ may vary according to the particular aircraft involved, exemplary values thereof being given in FIG. 8 with regard to fixed airfield landings.

To better understand the requisite nature of the lateral or roll command computer, Equation 4 may be rewritten as follows:

(4) $\qquad \phi_C(s) = K_C'\left(1 + T_R's + \frac{1}{T_i's}\right)Y_E(s)$ (5) $\qquad \phi_C = K_C'\left(Y_E + T_R'\dot{Y}_E + \frac{1}{T_i'}\int Y_E dt\right)$ it being noted that Equation 5 is identical to the above general Equation (B) with $K_1 = K_C'$; $K_2 = K_C'T_R'$; and $$K_3 = \frac{K_C'}{T_i'}$$

Further, $K_C' = mK_C'_{\max.}$ where $m$ is a function of range and $0 < m < 1$.

Figure 5A:
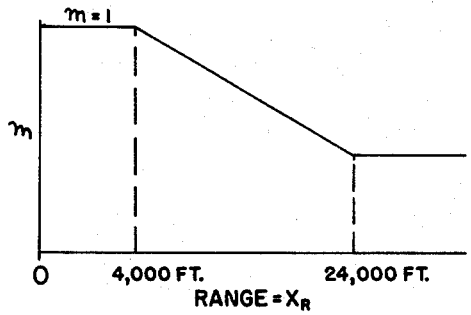
FIG. 5A is a chart showing the variation of the lateral computer gain coefficient $K_c'$ with range.

Referring to FIG. 5, the lateral position of the aircraft as detected by the radar 10 is a direct indication of lateral error $Y_E$ and is so indicated, such error being directly applied to the lateral command computer as shown in FIG. 5. This error is first applied to a multiplying network 61 wherein the error signal $Y_E$ is multiplied by the selected scale constant $K_C'_{\max.}$ obtained by means of the potentiometer 62. The output of the multiplying network 61 is applied to a further multiplying network 67 where such product is multiplied by the variable scale factor $m$. The variable scale factor $m$ is obtained from the movable arm of potentiometer 62' and this scale factor is varied as a function of range $X_R$, in the manner indicated in FIG. 5A, by the range-responsive servomechanism 67'. The resultant output $mK_C'_{\max.} Y_E$ is applied to the two networks shown, one in which the product is integrated and multiplied by a scale constant $$\frac{1}{T_i'}$$

in networks 63 and 64 respectively; and one in which the product is differentiated and multiplied by a scale constant $T_R'$, in networks 65 and 66 respectively. The scale constant $T_R'$ for the multiplying network 66 is obtained by means of the potentiometer 68 and the scale constant $$\frac{1}{T_i'}$$

for the multiplying network 64 is obtained by means of the potentiometer 69, as shown. The outputs of these two branches plus the output of the multiplying network 67 are summed in the network 70 and applied, through a limiter 71, to the data link 14.

As set forth above, the product $K_C' Y_E$ is made a function of the radar-measured range $$[K_C' Y_E = m K_{C\,max}' Y_E;\ m = f(X_R)]$$

by means of a servomechanism 67' which is actuated as a function of the radar-measured range. As shown in FIG. 5A, the coefficient $m$ is maintained at a minimum until the range equals 24,000 feet, after which the coefficient is linearly increased to the maximum at 4,000 feet range. Obviously, any servomechanism or its equivalent may be used to obtain this variation as shown in FIG. 5A.

Further, the integral term $$\frac{1}{T_i'} \int Y_E dt$$

is eliminated from the roll command in the initial stages by means of the normally open switch 64', as shown. This switch is controlled by a suitable mechanism, such as the servomechanism 64'', actuated as a function of the radar-measured range $X_R$. Thus, at acquisition at the radar "gate," the switch 64' is open and the roll commands are a function primarily of the differential term $T_R' \dot{Y}_E$ and, in attenuated form, of the lateral error $K_C' Y_E$, the integral term, $$\frac{1}{T_i'} \int Y_E dt$$

being absent. Preferably, the potentiometer-servomechanism combination 62', 67' is such as to increase the effect of the static gain coefficient $K_C'$ by a factor of six between the ranges of 24,000 feet and 4,000 feet, as shown in FIG. 5A. The purpose for the control of the product $K_{C\,max}' m Y_E$ as a function is to render the effect of the radar noise independent of aircraft range. That is to say, the radar noise is essentially an angular noise and therefore the average noise amplitude, expressed as apparent lateral error, increases proportionately with range. By multiplying the radar output $Y_E$ with a factor $m$ which is small at long ranges and large at short aircraft ranges, the noise amplitude in the signal $$K_{C\,max}' m Y_E$$

becomes practically independent of range.

Figure 5B:
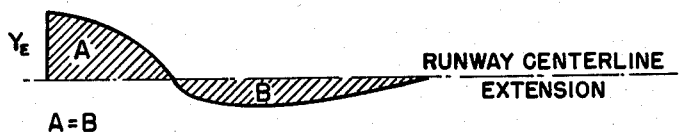
FIG. 5B is a diagram illustrating the effect of adding integral control too early.

Insofar as the integral term $$\frac{K_C'}{T_i'} \int Y_E dt$$

is concerned, the contribution thereof will result in an excessive overshoot condition if the term is introduced when the aircraft is too far removed from the runway centerline extension. This overshoot condition becomes unavoidable when the integral term is originally and continuously employed since it can theoretically be shown that the area between the flight path and the runway centerline extension must be the same prior and after cross over as indicated in FIG. 5B. Preferably the servomechanism 64'' introduces the integral term only after the range has been reduced to 7,000 feet, a point which represents a position near or over the runway centerline even if the aircraft has entered the "gate" with maximum lateral error. This selected range (7,000 feet) for introduction of the integral term $$\frac{K_C'}{T_i'} \int Y_E dt$$

is determined in any case by means of the range at acquisition or "lock-on" and the maximum roll command as dictated by the limiter network 71. In other words, the range at acquisition, the maximum lateral error at the "gate" and the roll command limit consistant with the preferred 3°/sec. turn rate must be such as to bring the aircraft at or near the runway centerline by the time range $X_R = 7,000$ feet even with the maximum lateral error occurring at acquisition.

In addition to the vertical and lateral command systems described above, the computer system may include component means for terminal control of the aircraft. Such additional means may be in the form of either or both a flareout system and a cross wind compensation system. As applied to a vertical control system, a pitch rate command $\theta_C'$ for flareout is formulated each instant such that the sink rate ($\dot{Z}$) and altitude (Z) of the aircraft will be brought to the desired value at the predicted instant of touchdown, at the desired position along the runway.

Figure 7:
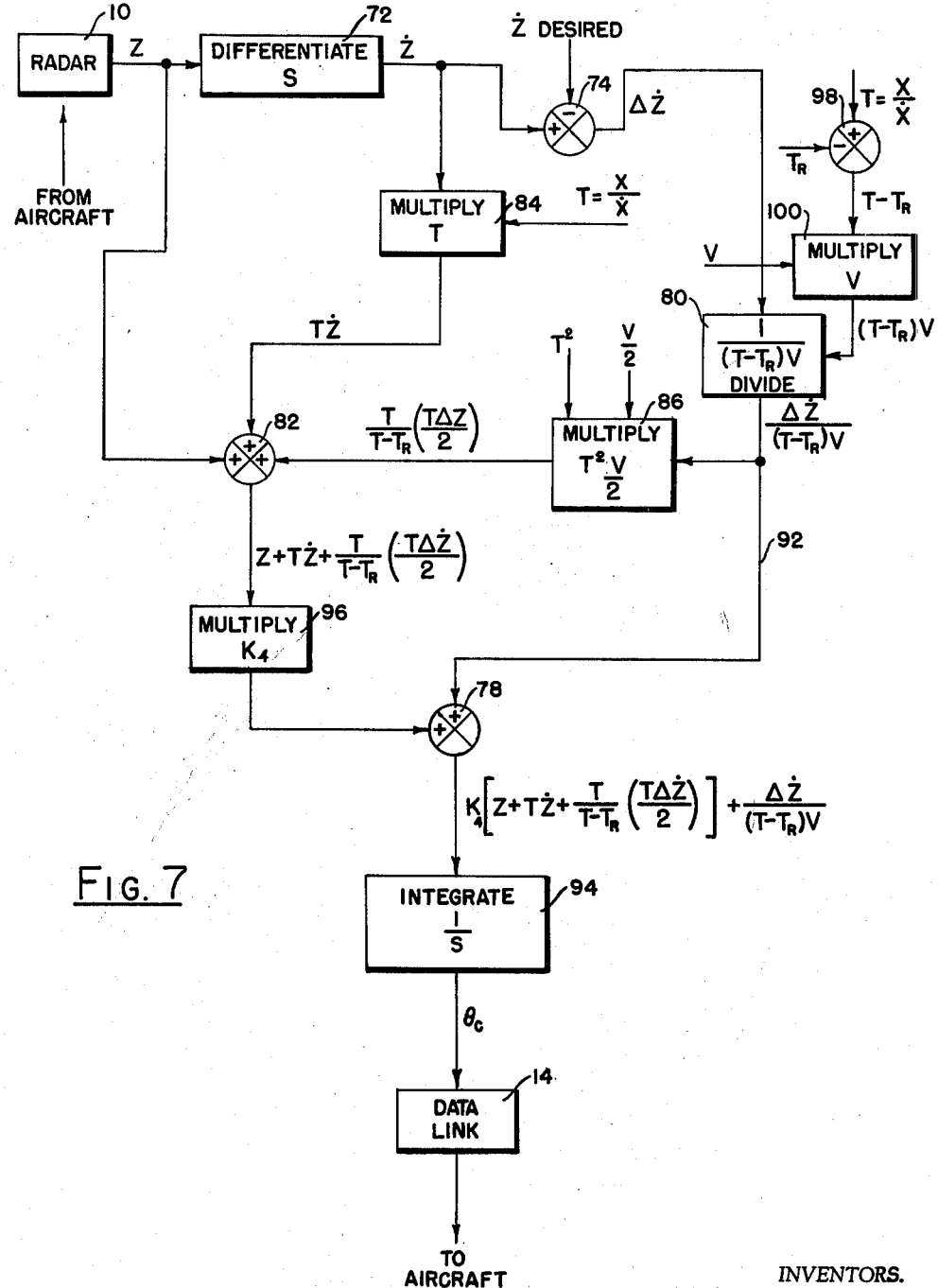
FIG. 7 is a diagram of one type of computer which may be used for flareout.

As disclosed herein, there are two systems for achieving flareout, as shown in FIGS. 7 and 9. In one of these, as shown in FIG. 7, the radar unit 10 is connected to the differentiating means 72 providing the output $\dot{Z}$ indicative of the sink rate of the aircraft at any given instant. The difference between the actual rate $\dot{Z}$ at any instant and that desired at touchdown ($\dot{Z}$ desired) is obtained by means of the substractor 74, such difference being designated by the symbol $\Delta \dot{Z}$. The composite signal transmitted by the data link 14 is the integral of the summation in the adding means 78 of an altitude command and a sink rate change command. In regard to the sink rate change, if such change is to be removed by a constant pitch rate command ($\ddot{Z}$=constant), the sink rate $\Delta \dot{Z}$ must be divided by some function of time-to-go and to satisfy this condition the output from subtractor 74 is applied to the dividing means 80 to obtain therefrom an output $$\frac{\Delta \dot{Z}}{(T - T_R) V}$$

The time-to-go, T, is equal to the radar-measured range ($X_R$) divided by the derivative of range ($\dot{X}_R$), $T_R$ is variable for different types of aircraft and is a rate-compensation to take account of the airframe-autopilot lags, and the aircraft velocity is included to introduce a function of vertical aircraft velocity (V being the resultant of $V_Z$, $V_Y$ and $V_X$).

At the same time, the predicted altitude at the intended touchdown instant is formulated in the summing means 82 by the summation of the actual altitude Z, corrected by the measured sink rate $\dot{Z}$ and the expected change of sink rate due to the pitch rate command computer in the instrumentality 80. Thus, the predicted altitude at the intended touchdown instant would be $$Z + T\dot{Z} + \frac{T}{T - T_R}\left(\frac{\Delta \dot{Z} T}{2}\right)$$

The first term of this function is obtained directly from the altitude output of the radar means 10, the second term is obtained from the output of the differentiating means 72, as multiplied by time-to-go, T, in the multiplying means 84 and the third term is obtained from the output of the dividing means 80 multiplied by the term $$\frac{V}{2} T^2$$

in the multiplying means 86, the latter term being introduced to obtain the proper units (feet) for the third term. The output of the summing means 82 is multiplied by a constant scale factor $K_4$ in multiplying means 96 and applied, together with the output 92, to the aforesaid summing means 78. The output of the last summing means is equal to $$\theta_C = K_4 \left[ Z + T\dot{Z} + \frac{T}{T-T_R}\left(\frac{T\Delta\dot{Z}}{2}\right) \right] + \frac{\Delta\dot{Z}}{(T-T_R)V}$$

and this output is then integrated in the integrating means 94 and applied as a vertical command $\theta_C$ to the date link 14 for transmission of the final signal to the aircraft.

To illustrate the manner of obtaining the term by which $\Delta\dot{Z}$ is divided in the means 80, it will be understood that an appropriate subtractor 98 has an input T obtained by the division of the radar-measured range $X_R$ by its differential $\dot{X}_R$ and an input $T_R$ which is fixed for the particular aircraft involved but which is variable to suit different types of aircraft. This difference, the output of the subtractor 98, is multiplied by the radar-measured velocity V in the multiplying means 100, as shown.

A considerably less complex, and preferred, flareout system may be employed directly in conjunction with the pitch command computer shown in FIG. 3. In such a combination, the voltage $Z_E$ is modified by the substitution of a voltage $Z_C'$ in place of $Z_C$ at the summing network 36 in FIG. 3, such substitution being initiated a predetermined time prior to touchdown and applied during the flareout. A system for obtaining the voltages $Z_C$ and $Z_C'$ illustrated in FIG. 9.

In FIG. 9, it will be seen that a suitable servo-mechanism 110 is controlled by a time-to-go amplifier 112 which has inputs from the radar-measured range $X_R$ and its derivative with respect to time $\dot{X}_R$. These voltages are divided to give an output proportional to the time-to-go $$T = \frac{X_R}{\dot{X}_R}$$

which is applied to and controls the servomechanism 110. In a practical embodiment of the invention, the servomechanism 110 is actuated beginning with $T=12$ seconds and it operates to produce linear movement from then until $T=0$. Actuated by the servomechanism 110 during the terminal period of the landing, that is during the 12 second flareout specifically, are the movable arms 114 and 116 of a pair of potentiometers 118 and 120, a pair of switches 126 and 128, and a delayed action switch 130, which is actuated, after delay, by the servomechanism actuator finger 132. All switches are shown in FIG. 9 in the deactivated state, prior to the start of the flareout.

The switches 126 and 128 are actuated at the beginning of the flareout period and remain actuated throughout such period. It will be noted that switch 126 has previously connected the memory circuit 134 with the multiplying network 32 so that when the flareout compensation system of FIG. 9 is actuated, the memory circuit stores a voltage representing the desired altitude $Z_C$ of the aircraft at that instant. That is, at the start of the flareout, the memory circuit may comprise a capacitance charging network so that the voltage representing the instantaneous desired position of the aircraft at the initiation of flareout is "remembered" thereby. This voltage is applied to the potentiometer 118 during the flareout period. Further, the potentiometer 118 is non-linear, being specifically of the exponential type, so that the movable tap of this potentiometer is at an exponentially varying potential as it is moved linearly by the servomechanism. The output of this tap or arm 114 is applied to the subtractor means 136 where the output of the potentiometer 120 is subtracted therefrom, the purpose of which will be presently apparent.

Referring to FIG. 10 wherein the normal glide slope path and the flareout path are shown, it will be appreciated that the point P represents the desired position of the aircraft at the initiation of flareout, the desired height at such instant being designated $Z_{CX}$. The subtraction of $8\dot{X}_R$ from $X_R$ as described in conjunction with FIG. 3 is desired so as to shift the glide slope so that with a flareout having a 4 second time constant, the touchdown point may be constant for aircraft of varying speeds. The stated values of 12 seconds, 8 seconds and 4 seconds are values which have proven possible in practice. However, other values may be also employed depending on the operational requirement of the landing system. If a constant range offset of $X_O$ is employed in place of $8X_R$, for example, the glide path prior to the start of flare will be independent of aircraft speed. If it is desired that the touchdown point also is independent of speed, then the time from start of flare to touchdown may be changed from 12 seconds, as required. The time constant may also be changed in this case if desired. The actual height $Z_R$ as measured by the radar will of course differ slightly from the desired height so that some altitude error $Z_E$ will be present. However, the exponential flareout command voltage will predominate at the initiation of and during flareout even though the altitude error $Z_E$ and its corresponding voltage will be increasing in opposition to the exponential voltage during at least some portion of the flareout path.

Since the exponential flareout command voltage is asymptotic in the particular system shown in FIG. 9, the potentiometer 120 is used to introduce a positive sink rate gradually and thus assure that the aircraft actually lands at the touch down point TD. The potentiometer 120 is non-linear and movable between zero signal and some voltage determined by the potential of the source to which it is connected. The rate of change of voltage at the arm 116 represents the desired sink rate at touchdown. In a practical embodiment, the potentiometer 120 gradually introduces a maximum sink rate of 2 ft./sec. at touchdown.

The voltage output at the movable arm 116 is applied to the aforesaid summing means 136 and the output thereof is applied through the switch 128 to the subtractor network 36 of FIG. 3. FIG. 9 illustrates the actual connection between the flareout command system 138 as above defined and the related portion of the pitch command computer shown in FIG. 3. In FIG. 9, the exponential voltage applied to the subtractor means 36 is represented by the symbol $Z_C'$ and is equal to the sum of the outputs of the two potentiometers 118 and 120 as aforesaid.

The flareout command system includes also means for providing a de-crab signal. Although such signal may be used to provide for automatic de-crab (through the autopilot), it has been found practical to merely provide a visual signal at about 2 seconds prior to touchdown to indicate that the de-crab maneuver should be then performed. Since the pilot has a visual display of both his actual azimuth and the azimuth of the landing strip, it is a simple matter for him to manually de-crab when signalled to do so. In FIG. 9, this signal is applied to the data link 14 by means of a relay 140 actuated in response to the closing of switch 130 by servomechanism arm or actuator 132 two seconds prior to touchdown.

For the purpose of description of this invention, it is to be understood that the terms "ground-located," "ground-based" and the like are meant to refer to the fact that the radar means, computer system, data transmitter and any related instrumentalities are based or located with respect to the actual landing strip, whether such landing strip be on the earth's surface, on the deck of a carrier or on any other suitable instrumentality. For landings on a regular airfield, the system according to FIG. 3 plus a flareout command system as in FIG. 9 would normally be used. Also, since only a high degree rather than an extreme degree of accuracy is necessary under such circumstances, the coefficient $T_1$ may remain fixed at some average value in each for all types of aircraft. When landings on a carrier deck are performed, the principles of the system of FIG. 3 may be used without any flareout, hence literally flying the aircraft onto the carrier deck. Since flareout is not used in carrier landings, the differentiating network 31, the multiplying network 35 and subtractor 29 of FIG. 3 are omitted. Instead, the altitude error $Z_E$ is determined by the difference between $X_R$ tan $\gamma$.

With reference now to FIG. 11, a system is shown for accomplishing landing aboard an aircraft carrier, even in conditions of zero visibility. The pertinent part of the system is shown in detail, being used between the radar 10 and the lateral and vertical computers shown in FIGS. 5 and 3 respectively with the exception that the means 31, 33, 35 and 29 are omitted from the system of FIG. 3. In this case, the radar 10, being mounted on the aircraft carrier, locates the aircraft to produce voltage outputs $X_D$, $Y_D$ and $Z_D$ including the motions of the carrier. The carrier has six degrees of freedom, the angular motions pitch, roll and yaw and the linear motions heave (vertical), surge (fore and aft) and sway (laterally). Of these, the effects of surge and sway are of little consequence and may be disregarded as in the system of FIG. 11. In FIG. 11, the functions of the three resolvers 200, 202 and 204 are to oppose the effect of pitch, roll and yaw in the coordinates $X_D$, $Y_D$ and $Z_D$ of the radar 10. Further, the heave output of the resolvers 206, 208 and 210 is used to offset or oppose the vertical motion of the carrier. Thus, the effect of the several resolver outputs as specified is to stabilize the projected glide path along the X, Y and Z axes. The result is that the origin of the glide path (the touchdown point) follows the carrier devoid of instantaneous motions due to pitch, roll, yaw and heave. However, as will hereinafter appear, at some predetermined time before touchdown, the vertical motion (heave) of the carrier is reintroduced in conjunction with a lead term so that just prior to touchdown, the aircraft flies a glide path in synchronization with the vertical motion of the carrier.

To achieve the above objectives, the resolvers 200 and 206; 202 and 208; and 204 and 210 are connected to servomechanisms 212, 214 and 216 respectively. The pitch and roll servomechanisms 212 and 214 are controlled from a gyroscopically stabilized two-axis vertical reference platform assembly 218 and the motions of the servomechanisms, indicative of pitch and roll motions of the touchdown point, are mechanically coupled to the previously mentioned resolvers. Likewise, the yaw servomechanism is controlled from the carrier's compass 220, the output being filtered in the network 222, to eliminate transient yawing motion (fish-tailing) of the carrier, while constraining the glide path to follow the steady state turns of the carrier.

As shown, the radar information which locates the aircraft in terms of carrier deck coordinate voltages $X_D$, $Y_D$ and $Z_D$ is fed to the input windings of the resolvers 200 and 202, the output of the resolver 200 being fed to the input windings of the resolvers 202 and 204 and the resolver 202 being coupled, all as shown specifically in FIG. 12. The resolvers 200, 202 and 204 constitute a resolver chain 199 and the outputs of the resolver 204 are the space-stabilized glide path coordinates $X_H$ and $Y_H$, the latter of which is fed to the lateral computer of FIG. 5 and the former of which is fed to the multiplying network 32 of FIG. 3.

The heave meter 201 consists of the orthogonally oriented accelerometers 230, 232 and 234 whose outputs are integrated twice (not shown) and connected to the previously mentioned resolvers 206, 208 and 210. The surge and sway outputs, as previously mentioned, are not used, but the vertical motion (heave) output is applied to the network 236 where this voltage is subtracted from the output of the resolver 202 as shown. The output $Z_H$ of the subtractor network 236 is applied to the summing network 36 of FIG. 3. As stated before, the voltages $X_H$, $Y_H$ and $Z_H$ represent a space stabilized glide path which is free from deleterious carrier motions and travels at the forward velocity of the carrier.

At a predetermined time before touchdown, preferably 12 seconds, the heave meter output is applied to a filter or lead network 240, through the switch 242, to the summing network 36 of the vertical or pitch command computer. The lead network 240 counteracts the autopilot-airframe lag and, consequently, constrains the airplane to follow a glide path which moves vertically in synchronism with the touchdown point in the carrier's deck, it being remembered that in the carrier-based system, no flareout is used. The switch 242 may be controlled by means of a suitable servomechanism 244 having a time-based input, similar to the switch control for flareout as described in conjunction with FIG. 9.

Any suitable data link may be employed, such as for example a proportional control link that works on a carrier frequency of say 400 mc. Or, a link using both localizer and glide slope channels of the conventional ILAS system may be employed. Low power VHF (Very High Frequency) and UHF (Ultra High Frequency) transmitters may be set up in the equipment trailer; their signals being modulated with the control signals and radiated directionally or omnidirectionally to the aircraft with ILAS receivers. When they are picked up by the aircraft, they are fed to a conventional autopilot approach coupler and to a standard cross-pointer indicator. Although the signals may be transmitted omnidirectionally, because of the positional data they carry, an imaginary glide path is projected in space. This glide path has advantages over that projected in the ILAS system since (a) it is much more accurate and stable, (b) it is not affected by reflections from buildings or terrain or moving vehicles near the antenna, (c) it may be tailored to the flight characteristics of the landing aircraft, (d) it may have a flared end for landing, (e) the aircraft position is known on the ground and can be displayed and monitored by appropriate means to insure safe operation at all times. The pilot may use his cross-pointer instrument to monitor an automatic approach. To him, it would be the same as flying an ILAS beam. Should the autopilot fail, he could fly the system manually by reference to his cross-pointer.

In the data link, whether it is a conventional linear element or a sampling device, a minimum digital data rate of about 10 samples/second is preferred. If the rate of the data link is much reduced below that figure, performance deteriorates because of lags, and because noises occurring at and near the sampling frequency multiples reflect back to lower frequency.

In connection with the present invention existing links are adequate for the purpose, and this significantly reduces the required data link capacity and RF channel requirements, and also reduces the required amount and complexity of the airborne equipment.

An important advantage incidental to ground computation of commands, is that the absolute error of vertical or lateral position is available in the ground equipment. If the airplane position, rather than commands, were transmitted to the airplane over the data-link, the accuracy of the landing would be completely dependent on the drift-stability of the data link. When commands are transmitted as in the present invention, it is possible to correct them in the ground-station so that the airplane's vertical and lateral errors vanish, despite data-link receiver drift.

*Typical landing operation procedure with the automatic landing system*

In the immediate future, ILAS glide slope and localizer facilities will probably remain in service, at least as secondary or feeder systems. Until such time as more elegant feeder systems are implemented, the landing system must be operationally compatible with present ILAS techniques and equipment. Assuming that prior to commencement of control by the automatic landing system the aircraft is following an ILAS localizer, with a horizontal error of not more than 6000 feet at 4 miles from touchdown. Also, assuming that the coupler is in a localizer and altitude-hold mode; that the aircraft is in level flight approaching the glide slope; and that the aircraft has an ILAS coupler capable of introducing pitch and bank commands into the autopilot. In such case "Lock-on" by the landing system will occur at a range of about 4 to 5 miles in fair weather, and at somewhat less range in very heavy rain. At radar lock-on, the aircraft should be approximately in level flight. The pilot closes the guidance loop by shifting to an ILAS frequency which is modulated by the pitch and bank commands generated by the ground equipment. In an aircraft with 2 ILAS receivers, the flags of the $x$-pointer tuned to the landing system will drop when radar lock-on occurs and transmission commences. Simultaneously with the loop closure by the pilot, the lead and washout gains of the ILAS coupler for the G.S. mode, should be reduced to zero; and the millivolts (or dots) to pitch or bank attitude should be set to a nominal value. These functions may be wired on a single switch.

The pitch command will normally be zero when this engagement occurs, implying that the plane should continue in level flight. Lateral correction starts immediately. When the plane reaches the commanded glide path, which should, if possible, coincide in space with the local ILAS receivers, the ILAS indicator shows a "fly-down" signal. In the rare cases that the airplane is above the glide slope at lock-on, it descends smoothly to the glide slope. When the airplane reaches the flare-out range, the altitude command path curves and the aircraft is rotated nose up by an appropriate pre-computed amount. A few seconds before touchdown at 2 ft./sec. vertical velocity, a signal is sent in order that pilot or autopilot may perform the de-crab maneuver.

If the radar unlocks prior to touchdown, the transmitter power is cut off and the ILAS meter flags rise to indicate waveoff. However, after touchdown, the waveoff circuit is disabled and commands are stored, to prevent any transients from occurring when the airplane passes beyond the radar's viewing angle and the radar unlocks. When and if the ILAS equipment is abandoned, or at sites where ILAS is not installed, it will become practical to consider use of the present invention with glide slopes other than the conventional ILAS slope, i.e., descent rates ideally suited to the operational characteristics of each aircraft type. Guidance sensitivity is low at long ranges and increases linearly with decreasing range, becoming constant at 4000 feet to touchdown. This changing sensitivity minimizes the magnitude of random control motion but provides uniform high sensitivity during the final approach and flareout.

It is to be understood that certain changes and modifications as illustrated and described may be made without departing from the spirit of the invention or the scope of the following claims.

We claim:
1. In an aircraft landing system, a radar-computer means combination for establishing a space-stabilized glide slope for aircraft,
    said computer means having a pitch command output including a term proportional to the altitude error determined by the difference between the radar-measured aircraft altitude and the theoretically correct altitude as determined by a predetermined glide-slope path, a term proportional to the derivative, with respect to time, of said altitude error, and a term proportional to the integral, with respect to time, of said altitude error.

2. In a closed loop landing system for aircraft, a radar-computer means combination for establishing a space-stabilized glide slope for aircraft,
    said computer means including a pitch command computer having means connected to the range output of said radar means for producing a voltage proportional to the instantaneously desired altitude of an aircraft, subtractor means connected to said voltage proportional to the desired altitude of an aircraft and to the altitude voltage output of said radar means for producing a voltage proportional to the altitude error of an aircraft,
    said pitch command computer also including means for differentiating said altitude error voltage with respect to time, means for integrating said altitude error voltage with respect to time, means for multiplying the altitude error voltage by a variable coefficient, means for multiplying the differentiated altitude error voltage by a variable coefficient, means for multiplying the integrated altitude error voltage by a variable coefficient, means for summing the last three voltages, and means for multiplying the summed voltage by a variable coefficient.

3. In the landing system according to claim 2 wherein said pitch command computer comprises a first multiplying network connected to the range output voltage of said radar means and to a voltage proportionate to the tangent of the desired glide slope angle, difference means for algebraically subtracting the altitude output voltage of said radar means from the output of said first multiplying network, a first branch including differentiating means for differentiating, with respect to time, the output of said difference means and a second multiplying network connected to the output of said differentiating means and to a variable voltage source, a second branch including a third multiplying network connected to the output of said difference means and to a second variable voltage source, a third branch including integrating means for integrating, with respect to time, said output of the difference means, a fourth multiplying network connected to the output of said integrating means and to a third variable voltage source, summing means connected to the outputs of said three branches for algebraically summing such outputs, a fifth multiplying network connected to the output of said summing means and to a fourth variable voltage source.

4. In the system according to claim 3 wherein switch means normally inactivates said third branch, said switch means being connected to the range output of said radar means to close said switch means when the range decreases to a predetermined value, and servomechanism connected to said fourth variable voltage source and controlled by the range output of said radar means to vary the output of such source between maximum and minimum limits.

5. In a closed loop landing system for aircraft in which the closed loop includes ground-located radar means and computer means connected to the output of said radar means,
    said computer means including a pitch command computer having an output of the form:

$$\theta_C = K_C\left[\left(1+\frac{T_R}{T_i}\right)Z_E + T_R\dot{Z}_E + \frac{1}{T_i}\int Z_E dt\right]$$

where $K_C$ = the static gain coefficient of the pitch command computer
$T_R$ = the lead time coefficient of the pitch command computer
$T_i$ = the pitch command computer integration time constant
$Z_E$ = the instantaneous altitude error of the aircraft
$\dot{Z}_E$ = the differential, with respect to time, of the altitude error and means for variably assigning a predetermined fixed value to the coefficient $T_R$.

6. In an aircraft landing system, a radar-computer means combination for establishing a space-stabilized glide slope for aircraft,
    said computer means having a pitch command output including a term proportional to the altitude error determined by the difference between the radar-measured aircraft altitude and the theoretically correct altitude as determined by a predetermined glide-slope path, a term proportional to the derivative, with respect to time, of said altitude error, and a term proportional to the integral, with respect to time, of said altitude error, said computer means also having a roll command output including a term proportional to the lateral position error of the aircraft, a term proportional to the derivative, with respect to time, of the lateral position error of the aircraft and a term proportional to the integral, with respect to time, of such lateral position error.

7. In an aircraft landing system, a radar-computer means combination for establishing a space-stabilized glide slope for aircraft, said computer means including a pitch command computer having means for producing an output voltage proportional to the altitude error of an aircraft as defined by the difference between the actual altitude of an aircraft and the desired altitude thereof, and also having means for differentiating such output with respect to time, means for integrating such output with respect to time and means for summing voltages proportional to such output, proportional to the differential thereof and proportional to the integral thereof.

8. In an aircraft landing system, a radar-computer means combination for establishing a space-stabilized glide slope for aircraft, said computer means including a pitch command computer having a pitch command output $\theta_C$ of the following general form:

$$\theta_C = K_C\left[(1+T_{RS})\left(1+\frac{1}{T_i s}\right)\right]Z_E$$

where $K_C$ = static gain coefficient of the pitch command computer $T_R$ = lead time coefficient of the pitch command computer $T_i$ = the pitch command computer integration time coefficient $Z_E$ = altitude error of an aircraft $s$ = the differential operator.

9. In an aircraft landing system, a radar-computer means combination for establishing a space-stabilized glide slope for aircraft, said computer means having a pitch command output including a term proportional to the difference between the radar-measured aircraft altitude and the theoretically correct altitude as determined by a predetermined glide-slope path, a term proportional to the derivative, with respect to time, of said altitude difference, and a term proportional to the integral, with respect to time, of the aforesaid altitude difference, said computer means also having a secondary pitch command output supplanting the first-mentioned output during flareout.

10. In the system according to claim 9 wherein said secondary pitch command output includes an exponentially variable voltage.

11. In an aircraft landing system, a radar-computer means combination for establishing a space-stabilized glide slope for aircraft, said computer means having a pitch command output including a term proportional to the difference between the radar-measured aircraft altitude and the theoretically correct altitude as determined by a predetermined glide-slope path, a term proportional to the derivative, with respect to time, of said altitude difference, and a term proportional to the integral, with respect to time, of the aforesaid altitude difference, said computer means also having a secondary pitch command output supplanting the first-mentioned output during flareout, said secondary pitch command output including a term proportional to the predicted altitude at touchdown and a term proportional to the total change in sink rate required during flareout divided by the radar-measured available time for such total change.

12. In an automatic landing system for aircraft, ground-located radar including means for substantially continuously determining the position of an aircraft in rectangular coordinates, means connected to the range coordinate voltage output of said radar and to a voltage proportional to the desired glide-slope angle and having an output voltage, representative of the desired altitude of the aircraft, which is the product of such voltages, algebraic difference means connected to the aforesaid desired altitude output voltage and to the altitude coordinate voltage of said radar and having an output voltage representative of the altitude error of the aircraft, command voltage means connected to the output of said algebraic difference means and including a multiplying circuit, a differentiating circuit, an integrating circuit and summing means for algebraically summing the outputs of such circuits, whereby the output of the command voltage means is in the general form:

$$\theta_C = C_1 Z_E + C_2 \dot{Z}_E + C_3 \int Z_E dt$$

where $C_1$, $C_2$ and $C_3$ are constants $Z_E$ = the output voltage representative of the altitude error of the aircraft $\dot{Z}_E$ = the first derivative, with respect to time of $Z_E$ and means connected to the output of the command voltage means for transmitting signals proportional to such output to an aircraft.

13. In a landing system for aircraft, a radar computer means combination for establishing a space-stabilized glide slope for aircraft, said computer means including a pitch command computer and a roll command computer having pitch command $\theta_C$ and roll command $\phi_C$ outputs of the following form:

$$\theta_C = K_C\left[\left(1+\frac{T_R}{T_i}\right)Z_E + T_R \dot{Z}_E \frac{1}{T_i}\int Z_E dt\right]$$

$$\phi_C = K_C'\left[Y_E + T_R'\dot{Y}_E + \frac{1}{T_i'}\int Y_E dt\right]$$

where $K_C$ = the static gain coefficient of the pitch command computer $K_C'$ = the static gain coefficient of the roll command computer $T_R$ = the pitch command computer lead time coefficient $T_R'$ = the roll command computer lead time coefficient $T_i$ = the pitch command computer integration time coefficient $T_i'$ = the roll command computer integration time coefficient $Z_E$ = the radar means-detected airframe altitude error $\dot{Z}_E$ = the first derivative, with respect to time, of $Z_E$ $Y_E$ = the radar means-detected airframe lateral error $\dot{Y}_E$ = the first derivative, with respect to time, of $Y_E$.

14. In a landing system for aircraft, a radar-computer combination for establishing an acquisition "gate" at a predetermined range and a space-stabilized glide slope path from said "gate" to a touchdown point, said radar-computer combination having intermediate voltage outputs indicative of the lateral and vertical position errors, $Y_E$ and $Z_E$, respectively of an aircraft relative to said glide slope path, said radar-computer combination also including a pitch command computer having a pitch command voltage output $$\theta_C = mK_C\left[\left(1+\frac{T_R}{T_i}\right)Z_E + T_R\frac{d}{dt}Z_E\right]$$

from said "gate" to a range point A remote from said touchdown point, a pitch command voltage output $$\theta_C = nK_C\left[\left(1+\frac{T_R}{T_i}\right)Z_E + T_R\frac{d}{dt}Z_E\right]$$

from said range point A to a range point B remote from said touchdown point, and a pitch command voltage output $$\theta_C = K_C\left[\left(1+\frac{T_R}{T_i}\right)Z_E + T_R\frac{d}{dt}Z_E + \frac{1}{T_i}\int Z_E dt\right]$$

between range point B and the touchdown point, wherein $K_C$; $T_R$ and $T_i$ are constants
$m$ is equal to about 0.25
$n$ is variable between $m$ and 1.0 as a function of decreasing range between range points A and B.

15. In a landing system according to claim 14 wherein said radar-computer combination includes means for cancelling pitch, roll, yaw and heave motions of said combination to space-stabilize said glide slope path,
and means for modifying the last mentioned means to eliminate the heave motion cancellation during the terminal approach of an aircraft.

16. In a landing system according to claim 14 wherein said radar-computer combination also includes a roll command computer having a roll command voltage output $$\phi_C = pK_C'\left[Y_E + T_R'\frac{d}{dt}Y_E\right]$$

from said "gate" to a range point C remote from said touchdown point, a roll command voltage output $$\phi_C = qK_C'\left[Y_E + T_R'\frac{d}{dt}Y_E\right]$$

from range point C to a range point D remote from said touchdown point, and a roll command voltage output $$\phi_C = K_C'\left[Y_E + T_R'\frac{d}{dt}Y_E + \frac{1}{T_i'}\int Y_E dt\right]$$

between said range point D and said touchdown point, wherein $K_C'$; $T_R'$ and $T_i'$ are constants
$p$ is equal to about ⅙
$q$ is variable between $p$ and 1.0 as a function of decreasing range between range points C and D.

17. In a landing system according to claim 16 wherein said radar-computer combination includes means for cancelling pitch, roll, yaw and heave motions of said combination to space-stabilize said glide slope path,
and means for modifying the last mentioned means to eliminate the heave motion cancellation during the terminal approach of an aircraft.

18. In an aircraft carrier-based landing system, the combination of
radar means for detecting the position of an aircraft, computer means for deriving command signal voltages for an aircraft as functions of the radar-detected position of such aircraft, and radiant energy means controlled by said computer means for transmitting command signals to an aircraft, in which all of the aforesaid means are located upon an associated aircraft carrier,
compensator means connected between said radar means and said computer means for freeing radar-detected aircraft position voltages of components due to uncontrolled motions of the associated aircraft carrier,
and final approach means controlled by said radar means as a function of range-to-go of a detected aircraft for introducing a component of uncontrolled vertical motion of the associated carrier in the aircraft position voltage output of said radar means, said final approach means including a lead network whereby an aircraft, on final approach, is constrained to fly a glide path having vertical deviations substantially synchronized with vertical motions of the associated aircraft carrier.

19. In an aircraft carrier-based landing system,
radar means,
resolver chain means connected to said radar means,
vertical reference means connected to said resolver chain means to produce range and lateral position outputs from said resolver chain means independent of pitch and roll motions of an associated aircraft carrier,
lateral computer means connected to said lateral position output of the resolver chain means,
a heave meter having an output proportional to the vertical heave motions of an associated aircraft carrier and connected to said resolver chain means to produce a vertical position output independent of heave motion of an associated aircraft carrier,
vertical computer means connected to said range and vertical position outputs,
and means including a lead network for introducing vertical motions of an associated aircraft carrier into said vertical position output.

20. In an aircraft carrier-based landing system, the combination of
radar means for detecting the position of an aircraft, computer means for deriving command signal voltages for an aircraft as functions of the radar-detected position of such aircraft, and radiant energy means controlled by said computer means for transmitting command signals to an aircraft, in which all of the aforesaid means are located upon an associated aircraft carrier,
compensator means connected between said radar means and said computer means for freeing radar-detected aircraft position voltages of components due to uncontrolled motions of the associated aircraft carrier,
and final approach means controlled by said radar means as a function of range-to-go of a detected aircraft for introducing a component of uncontrolled vertical motion of the associated carrier in the aircraft position voltage output of said radar means, said final approach means including a lead network whereby an aircraft, on final approach, is constrained to fly a glide path having vertical deviations substantially synchronized with vertical motions of the associated aircraft carrier,
said computer means having a pitch command output including a term proportional to the altitude error determined by the difference between the radar-measured aircraft altitude and the theoretically correct altitude as determined by a predetermined glide-slope path, a term proportional to the derivative, with respect to time, of said altitude error, and a term proportional to the integral, with respect to time, of said altitude error.

21. In an aircraft carrier-based landing system, the combination of
radar means for detecting the position of an aircraft, computer means for deriving command signal voltages for an aircraft as functions of the radar-detected position of such aircraft, and radiant energy means controlled by said computer means for transmitting command signals to an aircraft, in which all of the aforesaid means are located upon an associated aircraft carrier, compensator means connected between said radar means and said computer means for freeing radar-detected aircraft position voltages of components due to uncontrolled motions of the associated aircraft carrier, and final approach means controlled by said radar means as a function of range-to-go of a detected aircraft for introducing a component of uncontrolled vertical motion of the associated carrier in the aircraft position voltage output of said radar means, said final approach means including a lead network whereby an aircraft, on final approach, is constrained to fly a glide path having vertical deviations substantially synchronized with vertical motions of the associated aircraft carrier, said computer means having a pitch command output including a term proportional to the altitude error determined by the difference between the radar-measured aircraft altitude and the theoretically correct altitude as determined by a predetermined glide-slope path, a term proportional to the derivative, with respect to time, of said altitude error, and a term proportional to the integral, with respect to time, of said altitude error, said computer means also having a roll command output including a term proportional to the lateral position of the aircraft, a term proportional to the derivative, with respect to time, of the lateral position error of the aircraft and a term proportional to the integral, with respect to time, of such lateral position error.

22. In an aircraft carrier-based landing system, the combination of radar means for detecting the position of an aircraft, computer means for deriving command signal voltages for an aircraft as functions of the radar-detected position of such aircraft, and radiant energy means controlled by said computer means for transmitting command signals to an aircraft, in which all of the aforesaid means are located upon an associated aircraft carrier, compensator means connected between said radar means and said computer means for freeing radar-detected aircraft position voltages of components due to uncontrolled motions of the associated aircraft carrier, and final approach means controlled by said radar means as a function of range-to-go of a detected aircraft for introducing a component of uncontrolled vertical motion of the associated carrier in the aircraft position voltage output of said radar means, said final approach means including a lead network whereby an aircraft, on final approach, is constrained to fly a glide path having vertical deviations substantially synchronized with vertical motions of the associated aircraft carrier, said computer means including a pitch command computer having means for producing an output voltage proportional to the altitude error of an aircraft as defined by the difference between the actual altitude of an aircraft and the desired altitude thereof, and also having means for differentiating such output with respect to time, means for integrating such output with respect to time and means for summing voltages proportional to such output, proportional to the differential thereof and proportional to the integral thereof.

23. In an aircraft carrier-based landing system, the combination of radar means for detecting the position of an aircraft, computer means for deriving command signal voltages for an aircraft as functions of the radar-detected position of such aircraft, and radiant energy means controlled by said computer means for transmitting command signals to an aircraft, in which all of the aforesaid means are located upon an associated aircraft carrier, compensator means connected between said radar means and said computer means for freeing radar-detected aircraft position voltages of components due to uncontrolled motions of the associated aircraft carrier, and final approach means controlled by said radar means as a function of range-to-go of a detected aircraft for introducing a component of uncontrolled vertical motion of the associated carrier in the aircraft position voltage output of said radar means, said final approach means including a lead network whereby an aircraft, on final approach, is constrained to fly a glide path having vertical deviations substantially synchronized with vertical motions of the associated aircraft carrier, said compensator means including a resolver chain, vertical reference means having pitch and roll outputs controlling said resolver chain and a heave meter controlled by said pitch and roll outputs of the vertical reference means.

References Cited by the Examiner
UNITED STATES PATENTS

| | | | |
|---|---|---|---|
| 2,459,482 | 1/49 | Bond | 343—6 |
| 2,741,760 | 4/56 | Franke | 343—6 X |
| 2,996,706 | 8/61 | Newell et al. | 343—5 |
| 3,018,959 | 1/62 | Thomas. | |
| 3,053,487 | 9/62 | Baldwin et al. | 343—5 |
| 3,131,018 | 4/64 | Brodzinsky et al. | 343—6 |

CHESTER L. JUSTUS, *Primary Examiner.*